(12) United States Patent
Yang et al.

(10) Patent No.: US 10,151,579 B1
(45) Date of Patent: Dec. 11, 2018

(54) ARRAY PHOTOELECTRIC SENSOR GRATING DISPLACEMENT DETECTION SYSTEM AND METHOD

(71) Applicant: GUANGDONG UNIVERSITY OF TECHNOLOGY, Guangzhou (CN)

(72) Inventors: Zhijun Yang, Guangzhou (CN); Yanfeng Li, Guangzhou (CN); Tiegen Cai, Guangzhou (CN); Qian Li, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/853,849

(22) Filed: Dec. 24, 2017

(30) Foreign Application Priority Data

Aug. 31, 2017 (CN) .......................... 2017 1 0772040

(51) Int. Cl.
*G01D 5/347* (2006.01)
*G01B 11/02* (2006.01)
*G01D 5/26* (2006.01)

(52) U.S. Cl.
CPC ............. *G01B 11/026* (2013.01); *G01D 5/26* (2013.01)

(58) Field of Classification Search
CPC .... G01B 11/25; G01D 5/347; G01D 5/34715; G01D 5/34746
See application file for complete search history.

(56) References Cited

U.S. PATENT DOCUMENTS

| | | | |
|---|---|---|---|
| 2008/0315076 A1* | 12/2008 | Kusano | G01D 5/2455 250/231.1 |
| 2013/0206970 A1* | 8/2013 | Tahara | G01D 5/35383 250/231.1 |
| 2015/0069225 A1* | 3/2015 | Kim | G01D 5/34776 250/231.1 |

* cited by examiner

*Primary Examiner* — Jonathan Hansen
(74) *Attorney, Agent, or Firm* — Wayne & King LLC

(57) ABSTRACT

The present invention has the advantages of simple structure, low detection cost, high measurement precision, high detection speed, strong practicability, etc. The present invention relates to a novel array photoelectric sensor grating displacement detection system and method. The system includes a parallel light source, an incremental glass grating ruler, photoelectric sensor arrays, a high-speed voltage comparator, a signal processing unit and a displacement display unit, wherein the incremental glass grating ruler is perpendicular to an irradiation direction, of the parallel light source.

8 Claims, 26 Drawing Sheets

ARRAY PHOTOELECTRIC SENSOR GRATING DISPLACEMENT DETECTION SYSTEM AND METHOD

CROSS-REFERENCE TO RELATED APPLICATIONS

This application claims priority to Chinese Patent Application No. 201710772040.1 with a filing date of Aug. 31, 2017. The content of the aforementioned applications, including any intervening amendments thereto, are incorporated herein by reference.

TECHNICAL FIELD

The present invention relates to the technical field of precision measurement, in particular to a novel array photoelectric sensor grating displacement detection system and method.

BACKGROUND OF THE PRESENT INVENTION

In the field of precision measurement, a grating ruler is often used as a displacement feedback apparatus, and the grating ruler utilizes a grating optical principle to measure a displacement or an angle precisely.

The existing grating ruler mainly includes two types, i.e., an incremental grating ruler and an absolute grating ruler, wherein the incremental grating ruler intervenes with an indicator grating through transmission or reflection depending on uniform scale lines irradiated by a light source to a glass or metal surface to generate alternately dark and bright moire fringes, and a moving distance is counted by counting the number of the fringes. The moire fringes can be subdivided according to requirements of measurement precision. Since a number of a simulation signal is subdivided, the signal is susceptible to the interference of an external environment and the detection precision is reduced. Moreover, when a resolution ratio is high, "step loss" may occur in a case of high-speed movement. The absolute grating ruler has a series of scribed lines with location coding information on a main grating ruler, thereby directly obtaining an absolute location and avoiding the "step loss" phenomenon, but a great amount of location coding information needs to be read, so that the processing speed is relatively low. Furthermore, the absolute grating ruler has high manufacturing requirements and high cost.

In general, no matter what way mentioned above is adopted, after the resolution ratio is increased, the feedback frequency is increased at a same speed; and due to the limitation of a highest cut-off frequency of an acquisition card, the resolution ratio is increased and the measurement speed is inevitably decreased.

Meanwhile, in order to improve the measurement precision, denser grating lines are needed, but the denser grating lines may lead to the increase of an acquisition amount of unit displacement data, causing that the "step loss" phenomenon occurs, the credibility of the data is reduced, and the "step loss" phenomenon is more apparent particularly at, a high-speed movement, state. In addition, by adopting a device with higher acquisition speed, the cost may be greatly increased. Therefore, high speed, high resolution ratio and high precision are intrinsic contradictions of the precision measurement of the grating.

The above-mentioned problems bring a challenge for high-speed and high-precision displacement positioning of electronic manufacturing equipment and need to be solved.

SUMMARY OF PRESENT INVENTION

A purpose of the present invention is to provide a novel array photoelectric sensor grating displacement detection system with simple structure, low detection cost, high measurement precision, high detection speed and strong practicability to overcome defects in the prior art.

In order to achieve the above-mentioned purpose, the present invention provides a technical solution as follows:

A novel array, photoelectric sensor grating displacement detection system includes a parallel light sour an incremental glass grating ruler, photoelectric sensor arrays, a high-speed voltage comparator, a signal processing unit and a displacement display unit, wherein the incremental glass grating ruler is perpendicular to an irradiation direction of the parallel light source; the photoelectric sensor arrays are placed in a pitch of the incremental glass grating ruler and separated from the grating ruler for a certain space, can be fixed to a detected object by utilizing a bracket and are uniformly distributed in a step shape; the high-speed voltage comparator is connected between the photoelectric sensor array and the signal processing unit and used for shaping an output signal of the photoelectric sensor array to obtain an ideal square wave signal, and for convenience in detection, the ideal square wave signal can be inputted into the signal processing unit after being reversed; and the signal processing unit is connected with the displacement display unit, and a displacement value obtained by calculation is displayed on the displacement display unit.

Further, a vertical distance L between adjacent photoelectric sensors in the photoelectric sensor array is: equal to $(H-n*K)/(n-1)$, and a horizontal distance between adjacent photoelectric sensors is equal to $(W-M)/(n-1)$, wherein H is a grating height, n is a number of the photoelectric sensors, K is, a height of the photoelectric sensor, W is a pitch, and M is a width of the photoelectric sensor in the moving direction of the incremental glass grating ruler.

In order to achieve the above-mentioned purpose, the present invention further provides a novel array photoelectric sensor grating displacement detection method used for the above-mentioned system which includes the following steps:

S1, enabling light emitted from a parallel light source to irradiate on an incremental glass grating ruler;

S2, receiving, by the photoelectric sensor arrays, light irradiation and outputting a high-level signal and a low-level signal according to whether the photoelectric sensor arrays are blocked by grating lines;

S3, shaping, by a high-speed voltage comparator, the outputted level signal;

S4, receiving, by a signal processing unit, a shaped signal, detecting a signal edge, judging a movement direction of the grating, counting, and obtaining a displacement value; and S5, displaying, by a displacement display unit, the displacement value obtained by the processing of the signal processing unit.

Further, the movement direction in step S4 is judged by utilizing a combinational logic according to characteristics of signals A, B and C respectively outputted by three adjacent photoelectric sensors; in the case of forward movement, the movement direction is $F_{forward}=\overline{A} \cdot B \cdot C$; and in the case of reverse movement, the movement direction is $F_{reverse}=A \cdot B \cdot \overline{C}$.

Further the signal processing unit detects a pulse edge by utilizing an edge detection method and counts the number, wherein the edge to be detected is a rising edge of the pulse.

Further, a calculation process of the grating displacement value is as follows:

When the grating is in forward movement, a calculation formula of the displacement S is S=S'+N×M wherein N is a number of pulses. M is a width of the photoelectric sensors in the moving direction of the incremental glass grating ruler, and S' is a previous displacement value; and when the grating is in reverse movement, the calculation formula of the displacement S is: S=S'−N×M.

Compared with the prior art, the principle of the present solution is as follows.

The parallel light source is irradiated on the incremental glass grating ruler; and since the photoelectric sensor has high sensitivity to the light irradiation intensity, the photoelectric sensors which are not blocked by grating lines of the incremental glass grating ruler receive all light irradiation and output the high level signal, and the blocked photoelectric sensors receive partial light irradiation or do not receive light irradiation, and output the low level signal since the light irradiation intensity is low. Since the waveform outputted by the photoelectric sensor when detecting the change of the light irradiation intensity is not, the ideal square wave signal, the outputted signal needs to be shaped. The present solution adopts the high-speed voltage comparator to shape the signal outputted from the photoelectric sensor to output the square wave signal; and for convenience in detection, the signal outputted to the signal processing unit after the high-low-level conversion, the edge of the pulse signal is detected, the movement direction is determined, counting is performed, and finally the displacement value is obtained.

Compared with the prior art, the present invention h the following advantages:

1. The detection speed is high: the displacement detection method signal is directly outputted by the photoelectric sensor; the output speed is high; and only the edges of the shaped pulses need to be detected and counted, thereby obtaining the displacement value; and compared with the existing grating ruler measurement system, the displacement measurement speed is consistent with speed of the incremental grating which does not need to be subdivided.

2. The practicability is strong: the requirement for the photoelectric sensors is low, and the size of the sensor can be greater than or smaller than the width of the grating fringes.

3. The detection cost is low: the moire fringes do not need to be counted, so that no indicator grating is needed, the structure is simplified, and the cost is saved.

4. The measurement precision is high: a measurement error is in direct proportion to the pitch and is in reverse proportion to the number of the photoelectric sensors uniformly distributed in the pitch.

5. The photoelectric sensor arrays are uniformly distributed in a step shape; the vertical distance L between adjacent photoelectric sensors is: L=(grating height H−the number n of the photoelectric sensors*height K of the photoelectric sensors/(the number n of the photoelectric sensors−1); a horizontal distance D between the adjacent photoelectric sensors is: D=(pitch W−width M of the photoelectric sensors in the moving direction of the incremental glass grating ruler)/(the number n of the photoelectric sensors−1); and the short circuit of the photoelectric sensors is avoided, so that the displacement detection method signal can be directly outputted by the photoelectric sensors.

DETAILED DESCRIPTION OF PREFERRED EMBODIMENTS

The present invention is further described below in, combination with specific embodiments.

Figure 1:
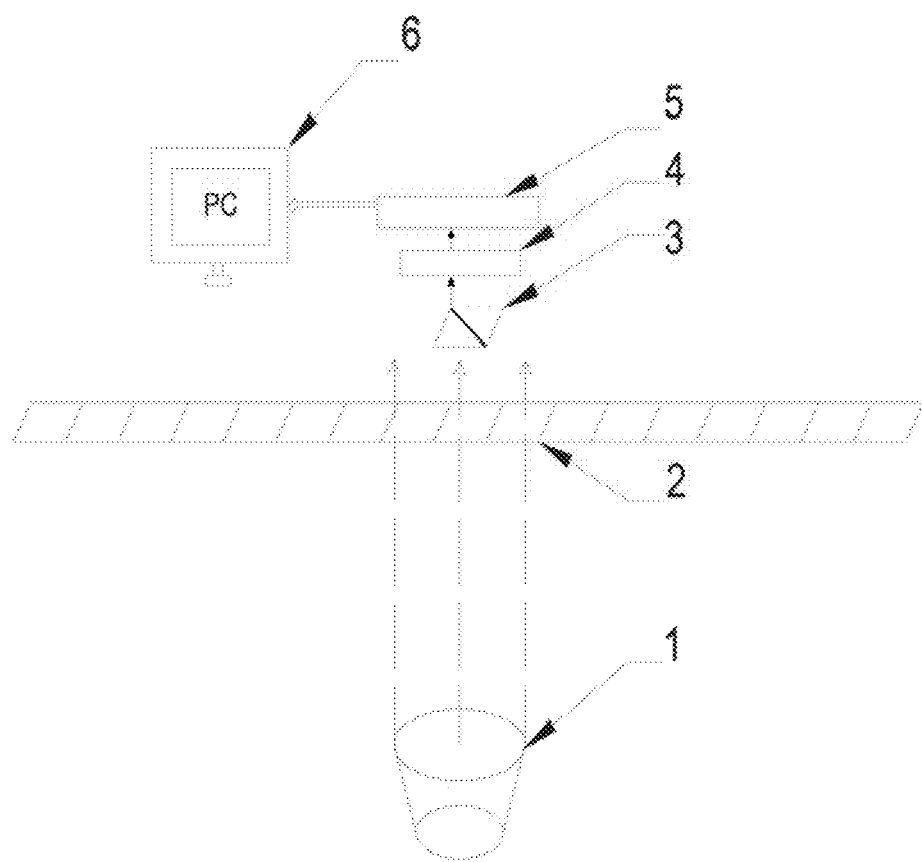
FIG. 1 is a structural schematic diagram of a novel array photoelectric sensor grating displacement detection system in the present invention.
Figure 2:
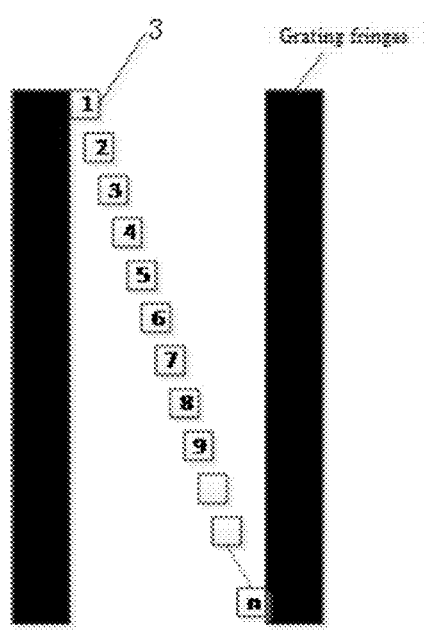
FIG. 2 is a distribution diagram of photoelectric sensors in a grating pitch in embodiments of the present invention.
Figure 3:
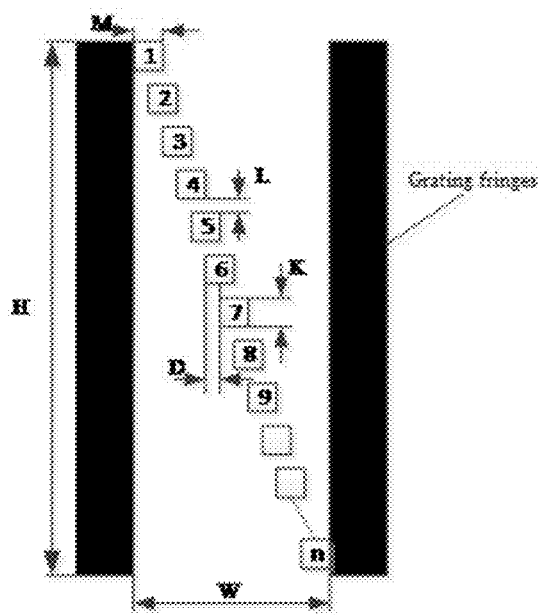
FIG. 3 is a location relationship diagram of photoelectric sensors in embodiments of the present invention.

Referring to FIGS. 1 to 3, a novel array photoelectric sensor grating displacement detection system of the present embodiment includes a parallel light source 1, an incremental glass grating ruler 2, photoelectric sensor arrays 3, a high-speed voltage comparator 4, a signal processing unit 5 and a displacement display unit 6, wherein the incremental glass grating ruler 2 is perpendicular to an irradiation direction of the parallel light source 1; the photoelectric sensor arrays 3 are placed in a pitch of the incremental glass grating ruler 2 and separated from the grating ruler for a certain space, can be fixed to a bracket of a detected object and are uniformly distributed in a step shape; a vertical distance L between adjacent photoelectric sensors is equal to (grating height H−the number n of the photoelectric sensors*height K of the photoelectric sensors)/(the number n of the photoelectric sensors−1); a horizontal distance D between adjacent photoelectric sensors is equal to (a pitch W−a width M of the photoelectric, sensors in the movement direction of the incremental glass grating ruler)/(the number n of the photoelectric sensors−1); the high-speed voltage comparator 4 is connected between the photoelectric sensor array 3 and the signal processing unit 5 and used for shaping an output signal of the photoelectric sensor array 3 and performing level conversion for the square wave signal obtained by shaping, and for convenience in detection, the ideal square wave signal is inputted into the signal processing unit after being reversed; and the signal, processing unit 5 is connected with the displacement display unit 6.

Figure 4:
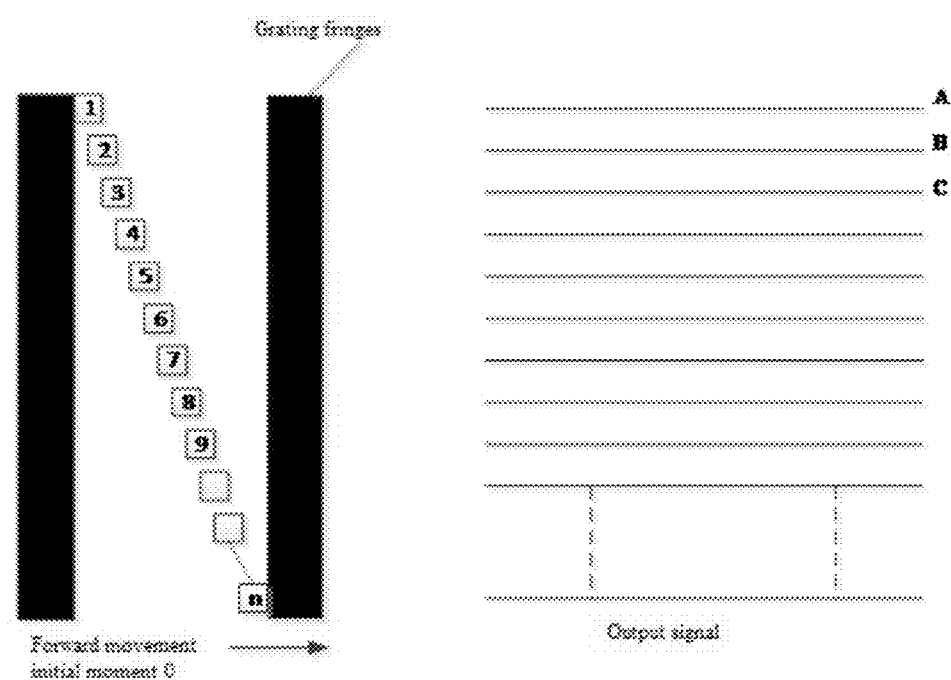
FIG. 4 is a schematic diagram of an initial location of forward movement of an incremental glass grating ruler in embodiments of the present invention.
Figure 5:
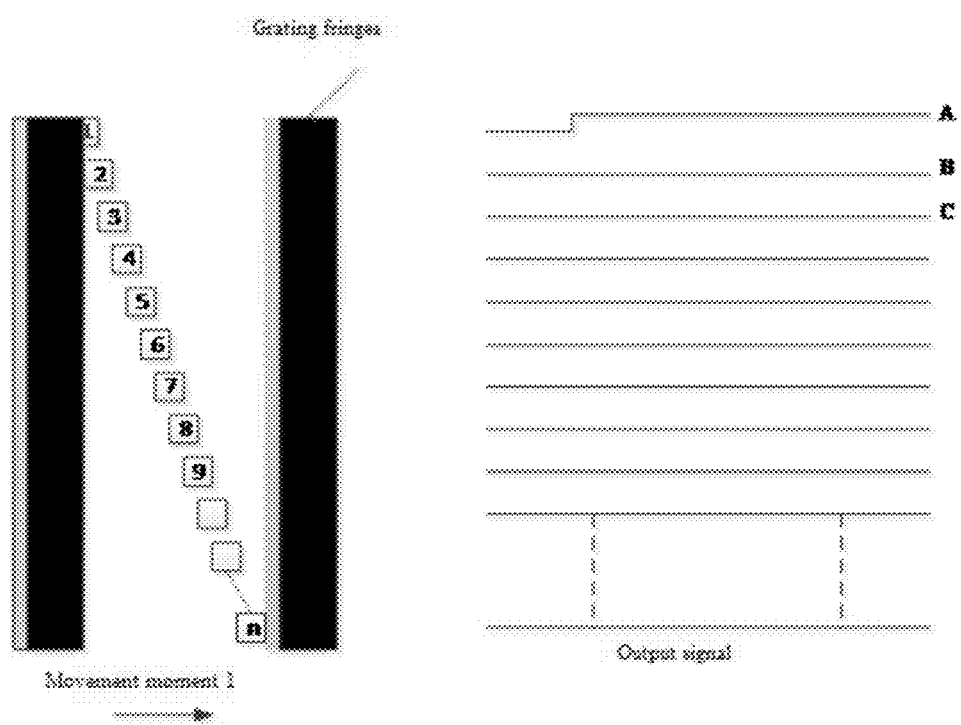
FIG. 5, FIG. 6, FIG. 7, FIG. 8, FIG. 9, FIG. 10, FIG. 11 and FIG. 12 are schematic diagrams of eight locations in a forward movement process of an incremental glass grating ruler and corresponding output signals in embodiments of the present invention.
Figure 6:
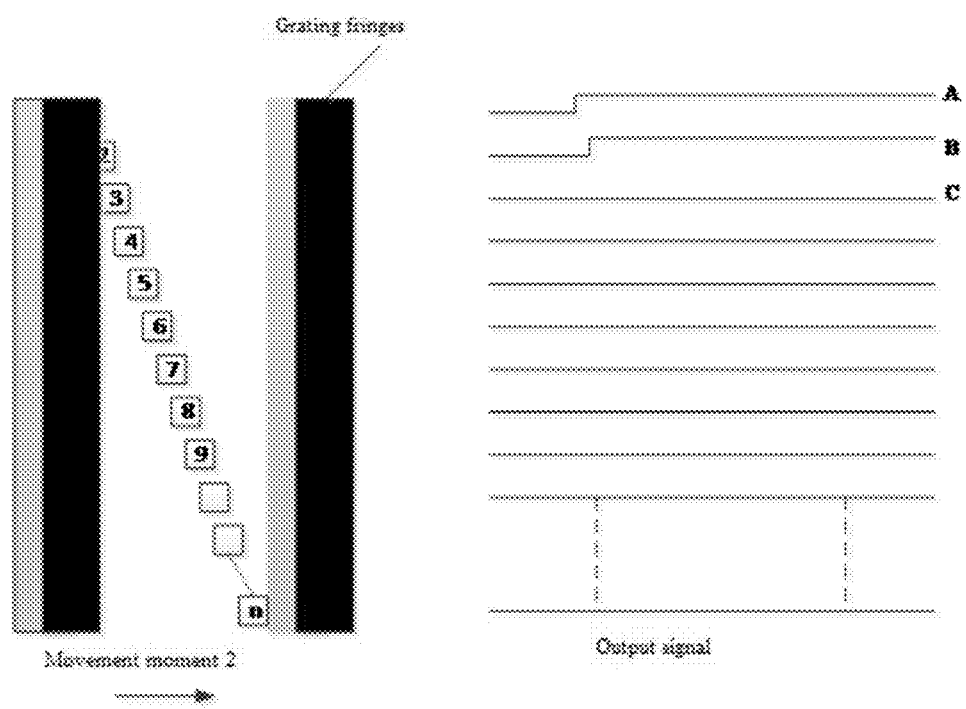
Figure 7:
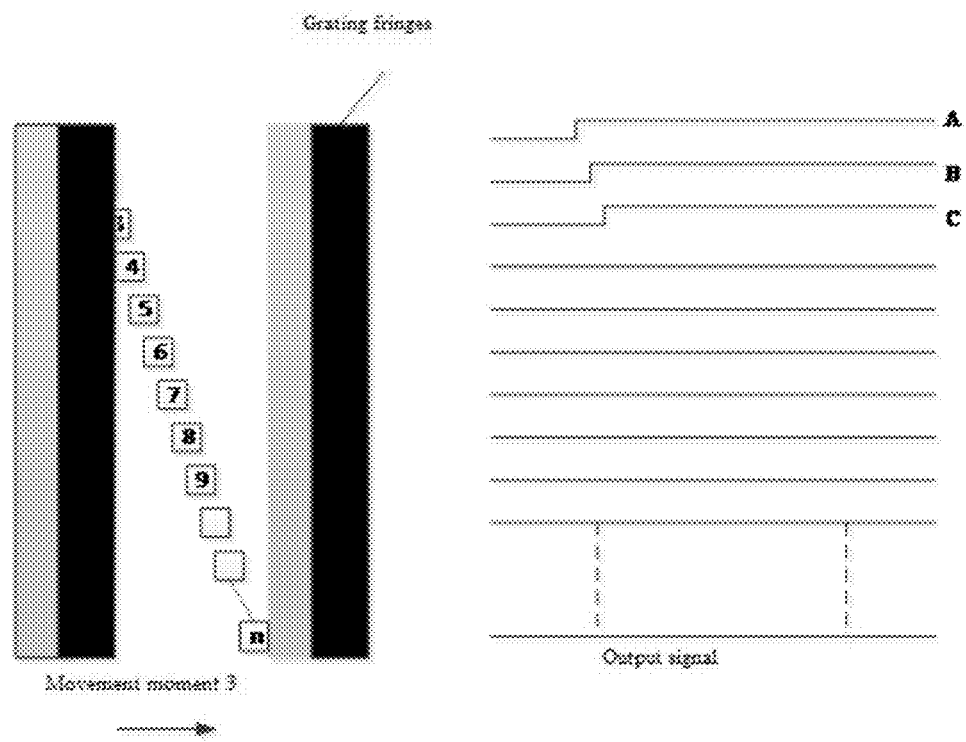
Figure 8:
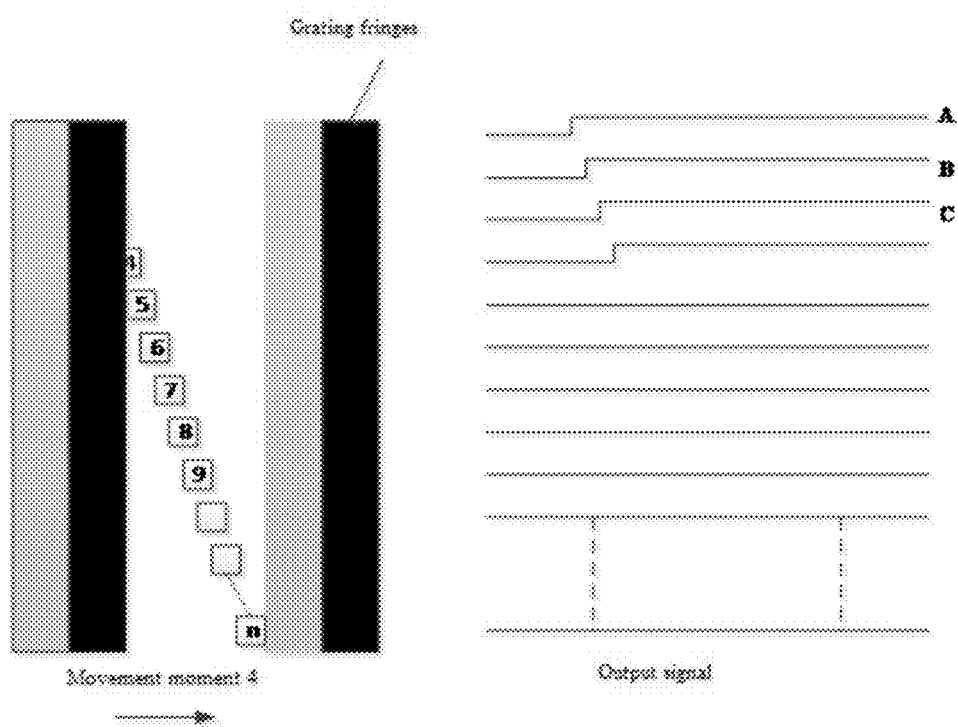
Figure 9:
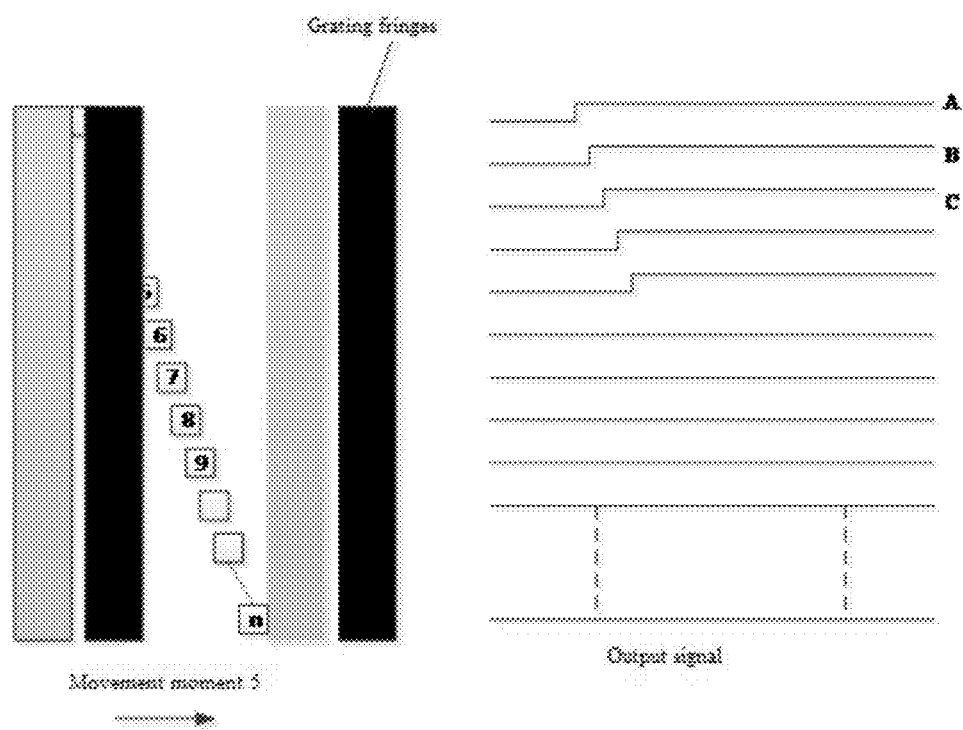
Figure 10:
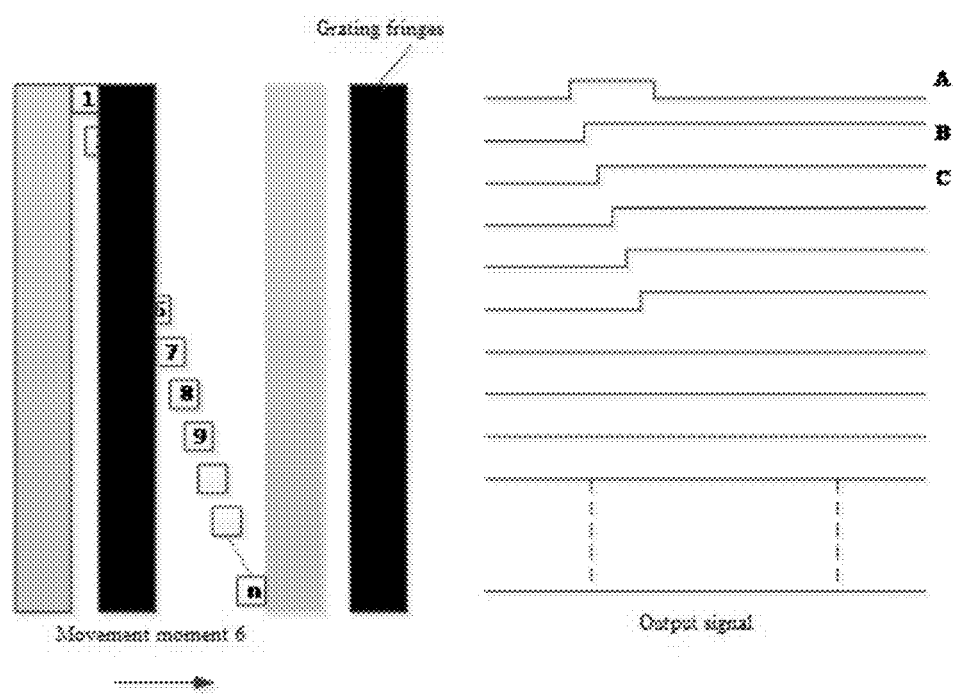
Figure 11:
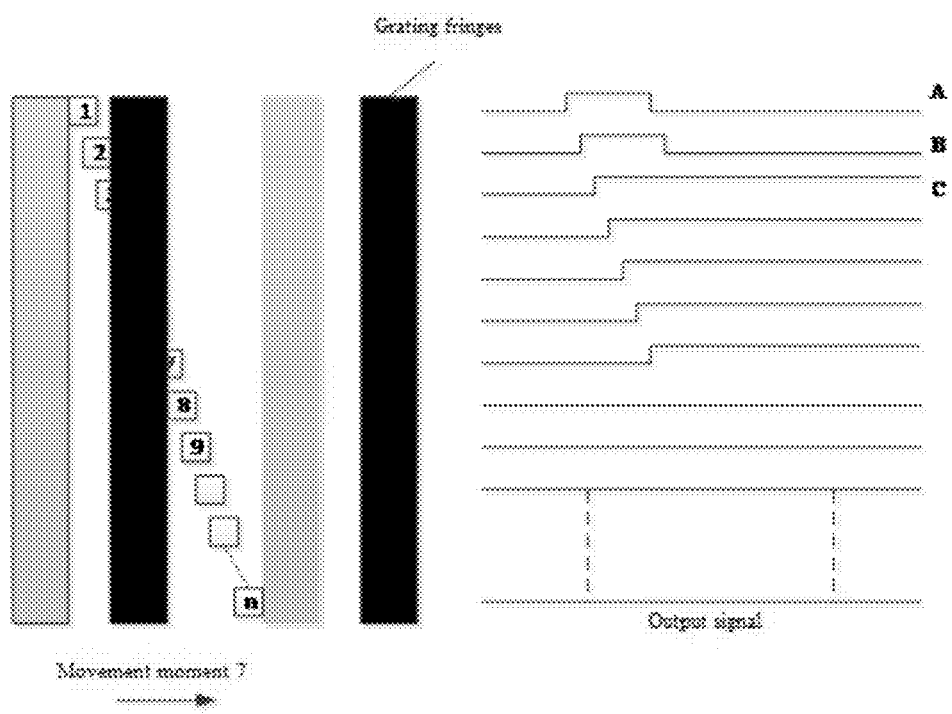
Figure 12:
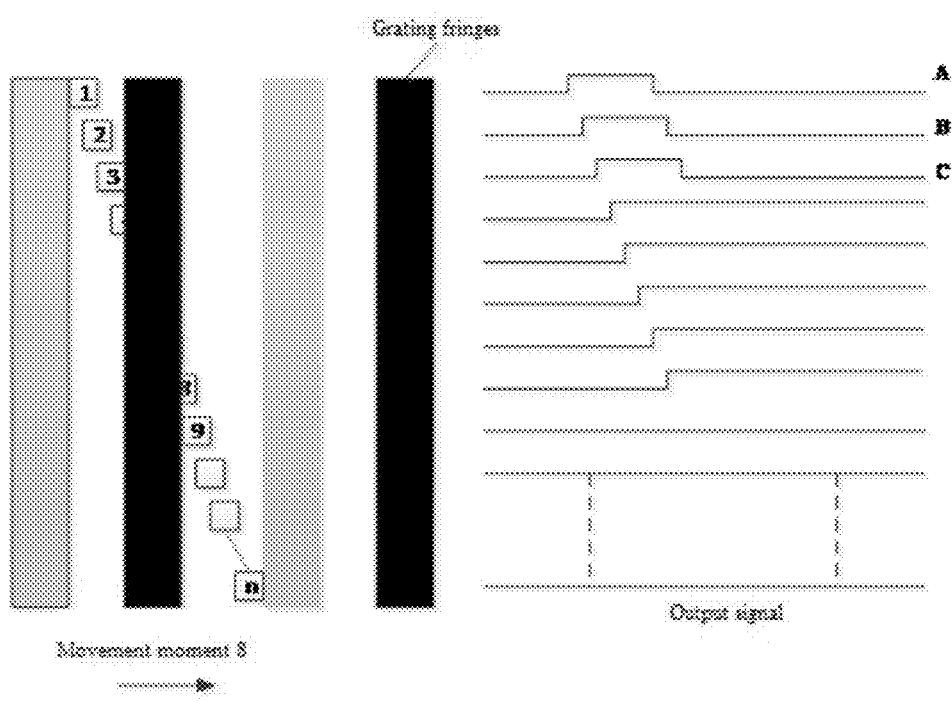
Figure 13:
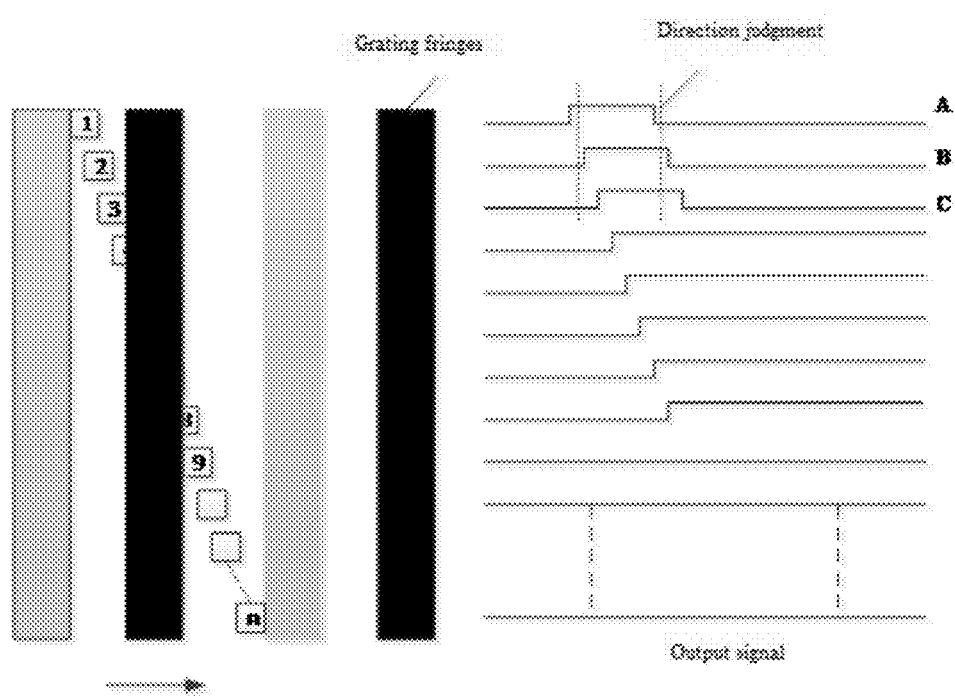
FIG. 13 is a schematic diagram of characteristics of an output signal as a basis for judging a forward movement direction in embodiments of the present invention.
Figure 14:
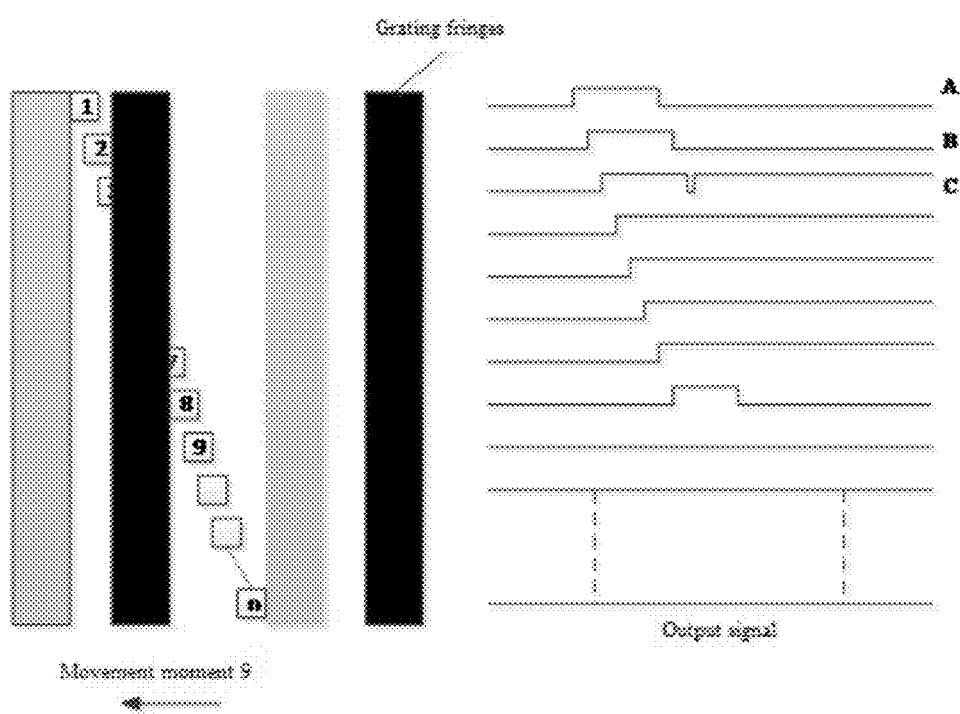
FIG. 14, FIG. 15, FIG. 16, FIG. 17, FIG. 18, FIG. 19, FIG. 20 and FIG. 21 are schematic diagrams of eight locations in which an incremental glass grating ruler is suddenly reversed in a forward movement process and corresponding output signals in embodiments of the present invention.
Figure 15:
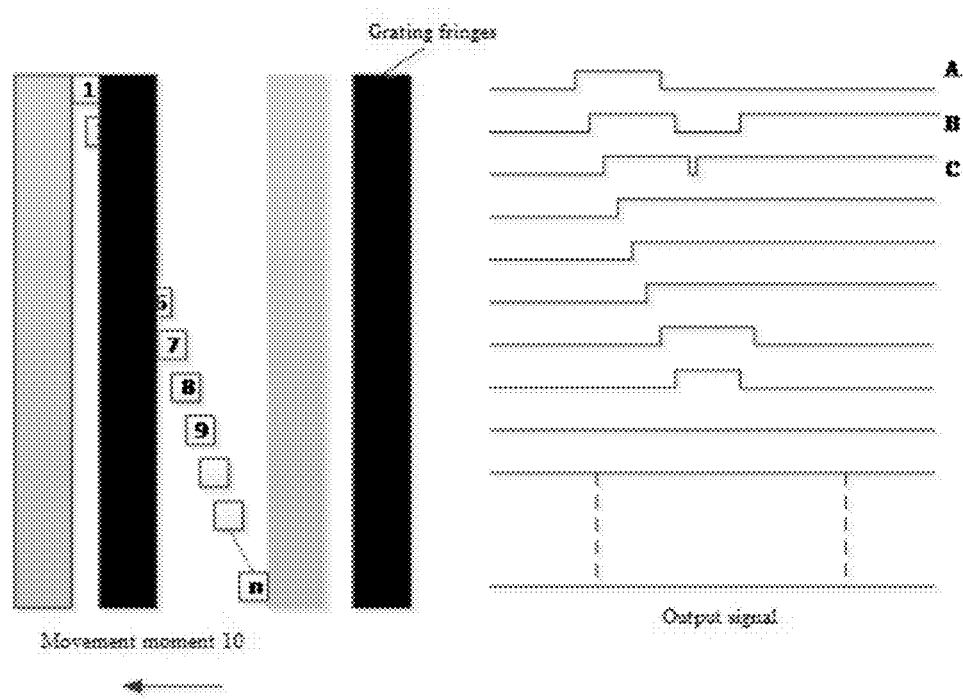
Figure 16:
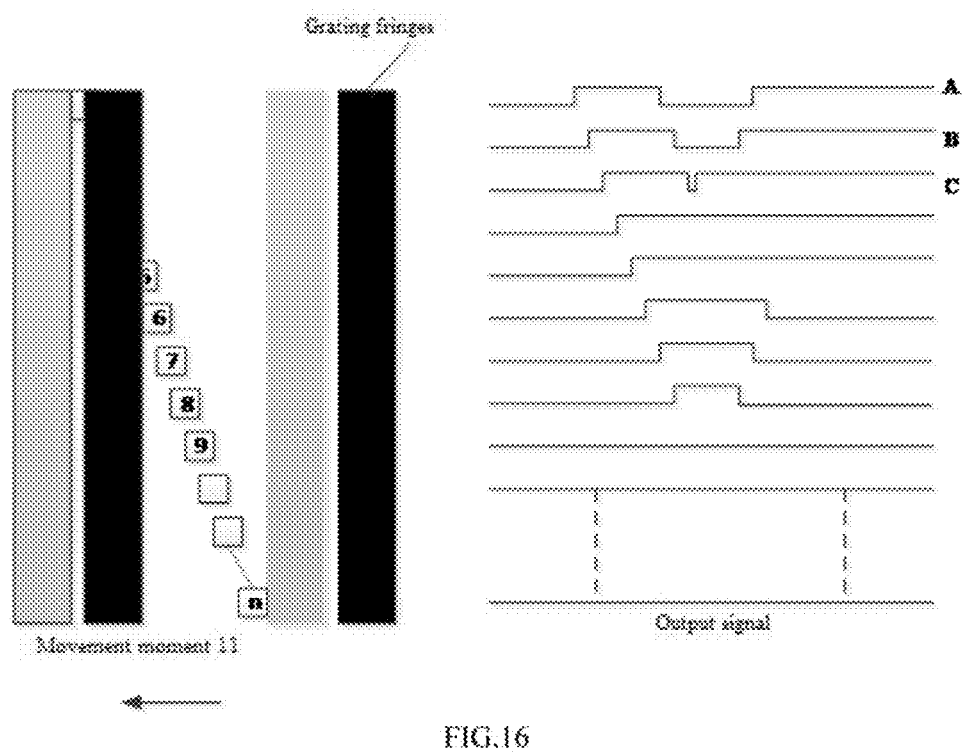
Figure 17:
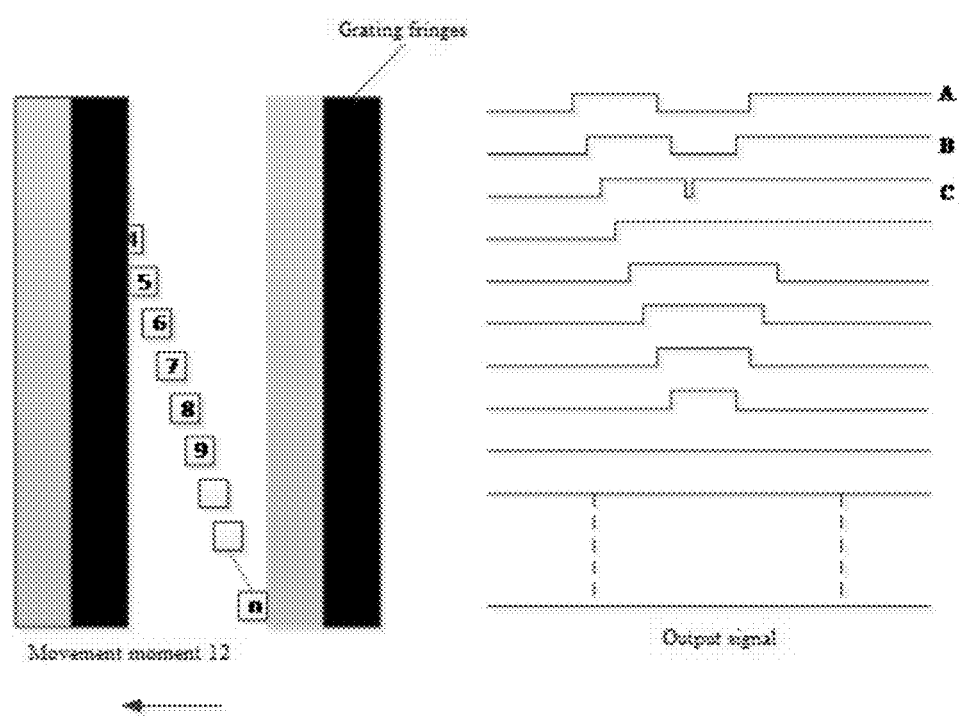
Figure 18:
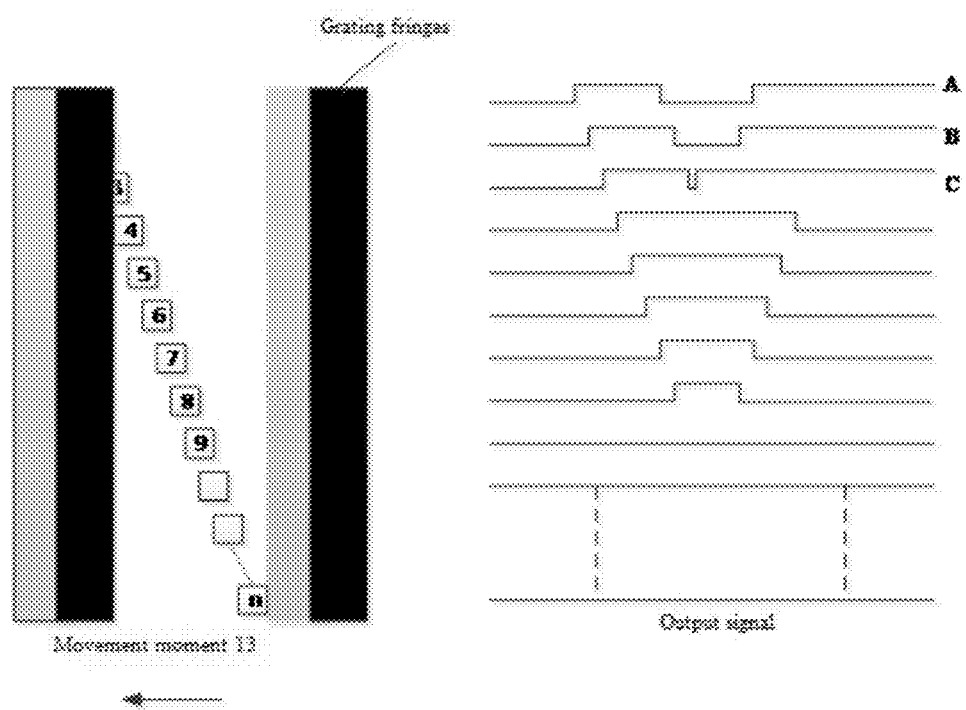
Figure 19:
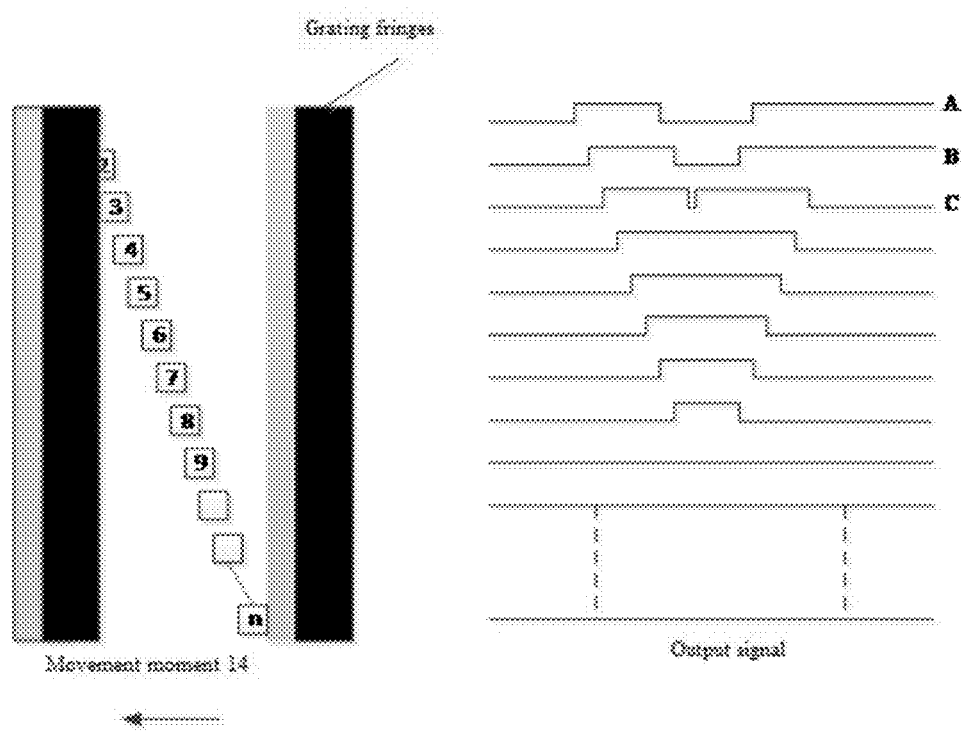
Figure 20:
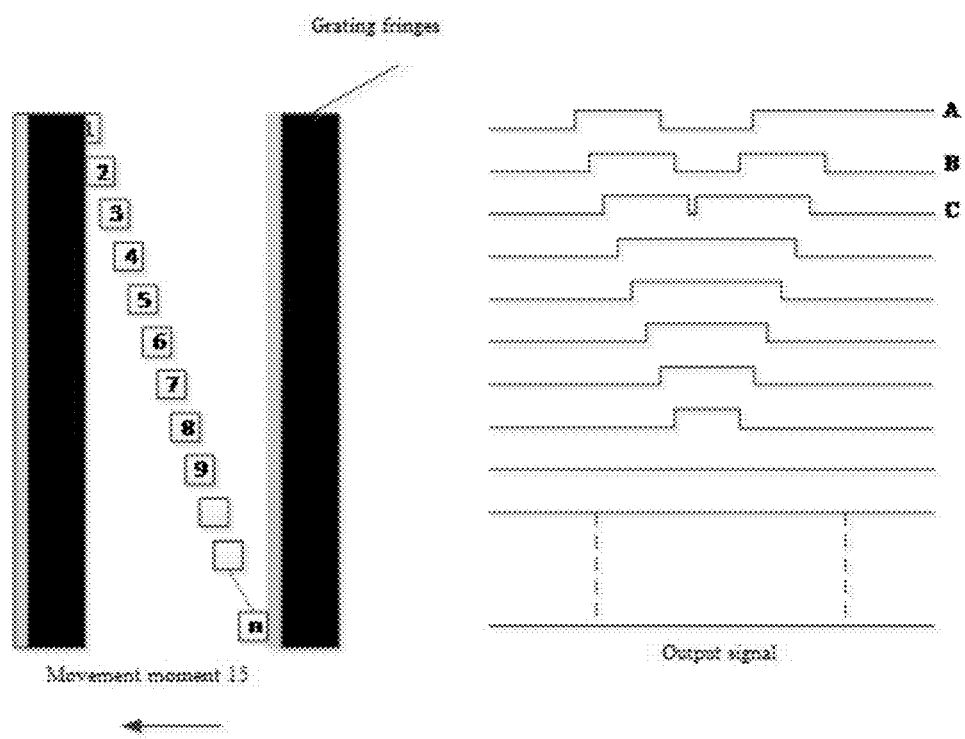
Figure 21:
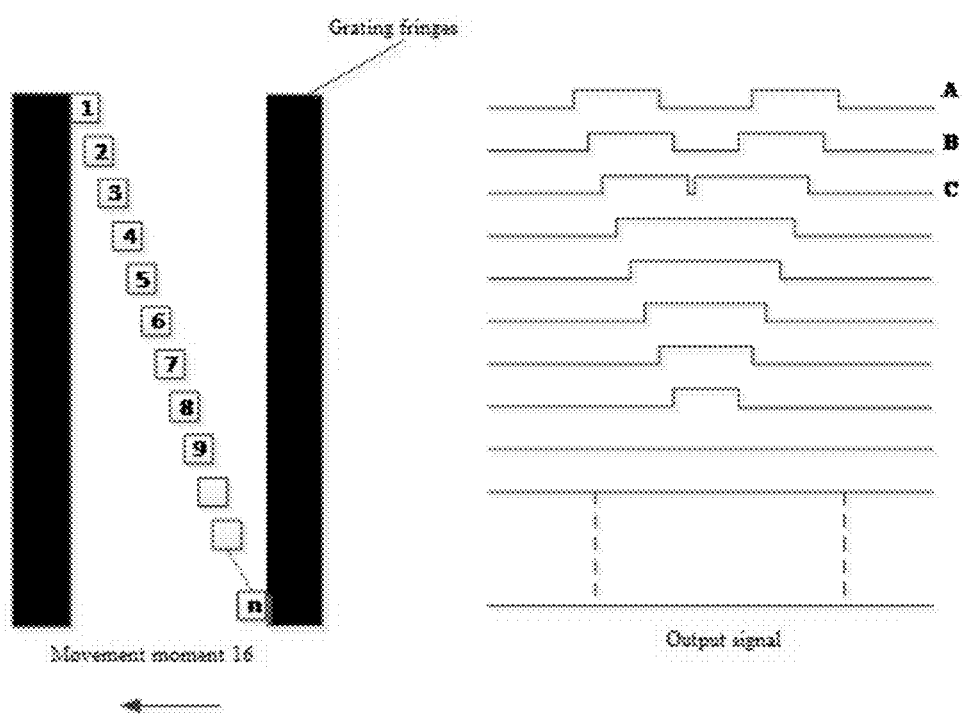
Figure 22:
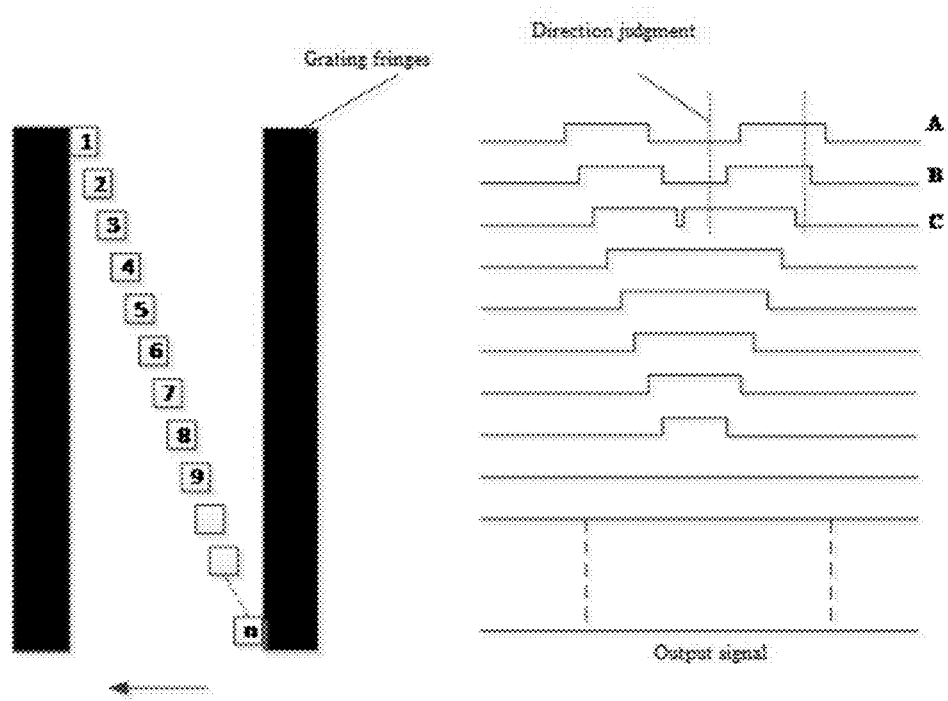
FIG. 22 is a schematic diagram of characteristics of an output signal as a basis for judging a direction of sudden reversing movement of an incremental glass grating ruler in a forward movement process in embodiments of the present invention.
Figure 23:
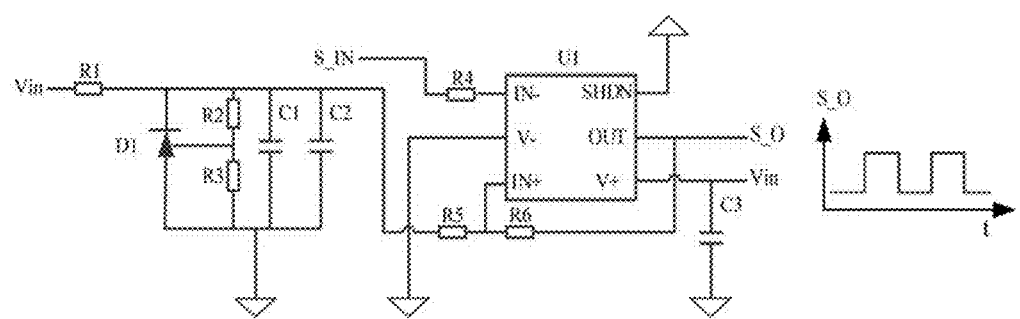
FIG. 23 is a schematic diagram of a circuit for shaping a non-square wave signal in embodiments of the present invention.
Figure 24:
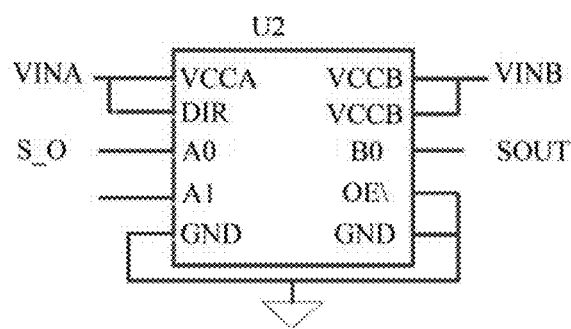
FIG. 24 is a schematic diagram of a circuit for converting a level when level conversion is needed in embodiments of the present invention.
Figure 25:
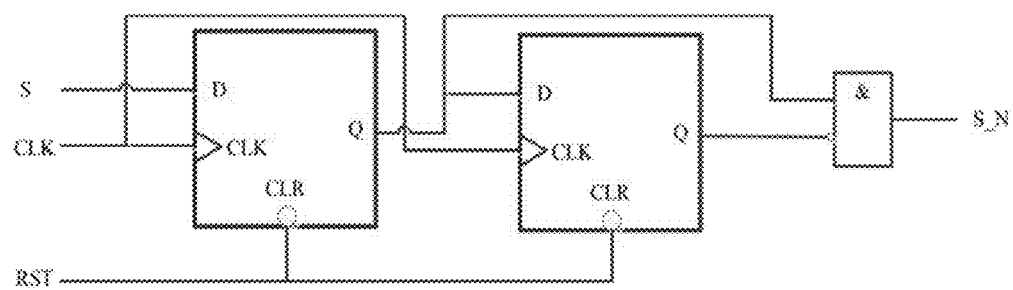
FIG. 25 is a schematic diagram of a circuit for detecting a pulse edge in embodiments of the present invention.
Figure 26:
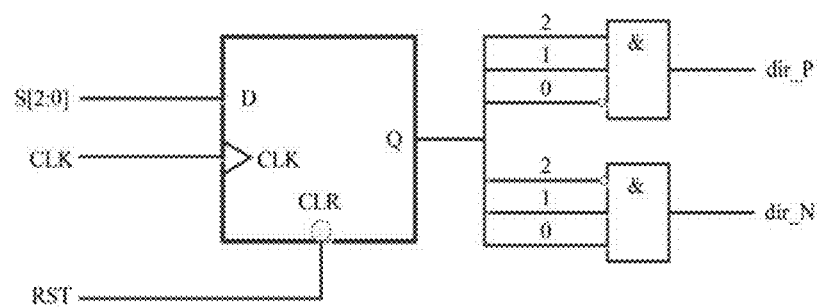
FIG. 26 is a diagram of a combinational logic circuit for judging a direction in embodiments of the present invention.

The working process of the system is as follows:

S1, light emitted from a parallel light source 1 is irradiated on an incremental glass grating ruler 2;

S2, photoelectric sensor arrays 3 receive light irradiation and output a high-level signal and a low-level signal according to whether the photoelectric sensor arrays 3 are blocked by grating lines;

S3, a high-speed voltage comparator 4 shapes an outputted level signal;

S4, a signal processing unit 5 receives a shaped signal, detects an edge of the signal, judges a movement direction of a grating, counts the number of the gratings, and obtains a displacement value; specific steps are as follows:

S41, it is assumed that the incremental glass grating ruler is in forward movement (rightwards) relative to the photoelectric sensor, and at an initial moment 0, the distribution of the photoelectric sensors in the grating pitch is shown in FIG. 4;

S42, at, a movement moment 1, the photoelectric sensors are blocked by the grating lines, the photoelectric sensors which are not blocked output a high level, and the blocked photoelectric sensors output a low level; and for convenience in detection in the present embodiment, the signal is reversed, i.e., the blocked sensors output the high level; otherwise, the blocked sensors output the low level (descriptions below are based on this), as shown in FIG. 5;

S43, the incremental glass grating ruler continuously moves to moments 2, 3, 4, 5, 6, 7 and 8, and the corresponding signals are respectively as shown in FIG. 5, FIG. 6, FIG. 7, FIG. 8, FIG. 9, FIG. 10, FIG. 11 and FIG. 12;

S44, the direction is judged by utilizing, the combinational logic according to the characteristics of the signals outputted by the three adjacent photoelectric sensors, and a combinational logic circuit is shown in FIG. 23; it is assumed that the output signals of the photoelectric sensors 1, 2 and 3 respectively correspond to A, B and C; in the case of the forward movement, the movement direction is $F_{forward}=\overline{A}\cdot B\cdot C$, as shown in FIG. 13; otherwise, if the incremental glass grating ruler moves leftwards relative to the sensor, the signal is outputted from a serial number/of the photoelectric sensor, and the movement direction is $F_{reverse}=A\cdot B\cdot \overline{C}$;

S45, it, is assumed that the direction is suddenly changed in the movement process, the direction is also judged by utilizing the combinational logic; the incremental glass grating ruler reversely moves to the moments 9, 10, 11, 12, 13, 14, 15 and 16; and the corresponding signals are respectively shown in FIGS. 14, 15, 16, 17, 18, 19, 20 and 21;

the incremental glass grating ruler suddenly moves reversely in the forward movement process, and the direction is judged according to the characteristics of the output signal, as shown in FIG. 22:

S46, the signal processing unit 4 detects the pulse edges by utilizing an edge detection method and counts the pulse edges, and the edge to be detected is a rising edge of the pulse; and a calculation process of the grating displacement value is as follows:

when the grating is in forward movement, a calculation formula, of the displacement S is: $S=S'+N\times M$, wherein N is a number of pulses, M is a width of the photoelectric sensors in the moving direction of the incremental glass grating ruler, and S' is a previous displacement value; and when the grating is in reverse movement, the calculation formula of the displacement S is: $S=S'-N\times M$; and S5, a displacement display unit 5 displays the displacement value obtained by the processing of the signal processing unit 4.

The present embodiment has the advantages of simple structure, low detection cost, high measurement precision, high detection speed, strong practicability, etc.

The above embodiments are only preferred embodiments of the present invention, not intended to limit an implementation scope of the present invention. Therefore, changes made according to the shape and principle of the present invention shall fall within the protection scope of the present invention.

We claim:

1. A novel array photoelectric sensor grating displacement detection system, comprising a parallel light source (1), an incremental glass grating ruler (2), photoelectric sensor arrays (3), a high-speed voltage comparator (4), a signal processing unit (5) and a displacement display unit (6), wherein the incremental glass grating ruler (2) is perpendicular to an irradiation direction of the parallel light source (1); the photoelectric sensor arrays (3) are placed in a pitch of the incremental glass grating ruler (2) and separated from the grating ruler for a certain space, can be fixed to a detected object by utilizing a bracket and are uniformly distributed in a step shape; the high-speed voltage comparator (4) is connected between the photoelectric sensor array (3) and the signal processing unit (5) and used for shaping an output signal of the photoelectric sensor array (3) to obtain an ideal square wave signal, and for convenience in detection, the ideal square wave signal can be inputted into the signal processing unit after being reversed; and the signal processing unit (5) is connected with the displacement display unit (6), and a displacement value obtained by calculation is displayed on the displacement display unit (6).

2. The novel array photoelectric sensor grating displacement detection system according to claim 1, wherein a vertical distance L between adjacent photoelectric sensors in the photoelectric sensor array (3) is: $L=(H-n*K)/(n-1)$, and a horizontal distance D between adjacent photoelectric sensors is: $D=(W-M)/(n-1)$, wherein H is a grating height, n is a number of the photoelectric sensors, K is a height of the photoelectric sensors, W is a pitch, and M is a width of the photoelectric sensors in the moving direction of the incremental glass grating ruler (2).

3. A novel array photoelectric sensor grating displacement detection method used for the system of claim 1, comprising the following steps:

S1, enabling light emitted from a parallel light source to irradiate on an incremental glass grating ruler;

S2, receiving, by the photoelectric sensor arrays, light irradiation and outputting a high-level signal and a low-level signal according, to whether the photoelectric sensor arrays are blocked by grating lines;

S3, shaping, by a high-speed voltage comparator, the outputted level signal;

S4, receiving, by a signal processing unit, a shaped signal, detecting a signal edge, judging a movement direction of the grating, counting, and obtaining a displacement value; and S5, displaying, by a displacement display unit, the displacement value obtained by the processing of the signal processing unit.

4. The novel array photoelectric sensor grating displacement detection method according to claim 3, wherein the high-speed voltage comparator in step S3 shapes an outputted non-ideal square wave signal when the photoelectric sensor detects the change of the light irradiation intensity, so as to obtain a required square wave signal.

5. The novel array photoelectric sensor grating displacement detection method according to claim 3, wherein for the shaped square wave signal in step S3, for convenience in detection, an ideal square wave signal can be reversed; and if an obtained level is incompatible with an input level of the signal processing unit, the shaped or reversed signal is subjected to level conversion into a signal matched with the signal processing unit.

6. The novel array photoelectric sensor grating displacement detection method according to claim 3, wherein the signal processing unit performs pulse edge detection for the shaped signal by utilizing an edge detection method and counts the number, wherein the edge to be detected is a rising edge of the pulse.

7. The novel array photoelectric sensor grating displacement detection method according to claim 3, wherein the movement direction in step S4 is judged by utilizing a combinational logic according to characteristics of signals A, B and C respectively outputted by three adjacent photoelectric sensors; in the case of forward movement, the movement direction is $F_{forward}=\overline{A} \cdot B \cdot C$; and in the case of reverse movement, the movement direction is $F_{reverse}=A \cdot B \cdot \overline{C}$.

8. The novel array photoelectric sensor grating displacement detection method according to claim 3, wherein a calculation process of the grating displacement value is as follows:

when the grating is in forward movement, a calculation formula of the displacement S is: $S=S'+N \times M$, wherein N is a number of pulses, M is a width of the photoelectric sensors in the moving direction of the incremental glass grating ruler, and S' is a previous displacement, value; and when the grating is in reverse movement, the calculation formula of the displacement S is $S=S'-N \times M$.

* * * * *